United States Patent [19]

Vissers et al.

[11] 4,029,860

[45] June 14, 1977

[54] COMPARTMENTED ELECTRODE STRUCTURE

[75] Inventors: Donald R. Vissers, Naperville; Hiroshi Shimotake, Hinsdale; Eddie C. Gay, Park Forest; Fredric J. Martino, Riverdale, all of Ill.

[73] Assignee: The United States of America as represented by the United States Energy Research and Development Administration, Washington, D.C.

[22] Filed: Feb. 12, 1976

[21] Appl. No.: 657,525

[52] U.S. Cl. .............................. 429/122; 429/218; 429/237

[51] Int. Cl.$^2$ ........................................ H01M 10/38

[58] Field of Search ............ 136/38, 36, 6. R, 6 LF, 136/6 A, 20, 100 R, 83 R, 83 T; 429/218, 233, 237, 245, 209, 112, 122

[56] References Cited

UNITED STATES PATENTS

| 1,933,928 | 11/1933 | Perkins | 136/38 |
| 2,727,080 | 12/1955 | Moulton | 136/38 X |
| 3,933,520 | 1/1976 | Gay et al. | 136/6 LF |
| 3,933,521 | 1/1976 | Vissers et al. | 136/6 LF |
| 3,947,291 | 3/1976 | Yao et al. | 136/6 LF |

OTHER PUBLICATIONS

Sudar, S. et al., Rechargeable Lithium/Iron Sulfide Battery, Inter–Society Energy Conversion Conference, Aug., 1975.

Primary Examiner—Anthony Skapars
Attorney, Agent, or Firm—Dean E. Carlson; Arthur A. Churm; Hugh W. Glenn

[57] ABSTRACT

Electrodes for secondary electrochemical cells are provided with compartments for containing particles of the electrode reactant. The compartments are defined by partitions that are generally impenetrable to the particles of reactant and, in some instances, to the liquid electrolyte used in the cell. During cycling of the cell, reactant material initially loaded into a particular compartment is prevented from migrating and concentrating within the lower portion of the electrode or those portions of the electrode that exhibit reduced electrical resistance.

10 Claims, 3 Drawing Figures

U.S. Patent   June 14, 1977   4,029,860
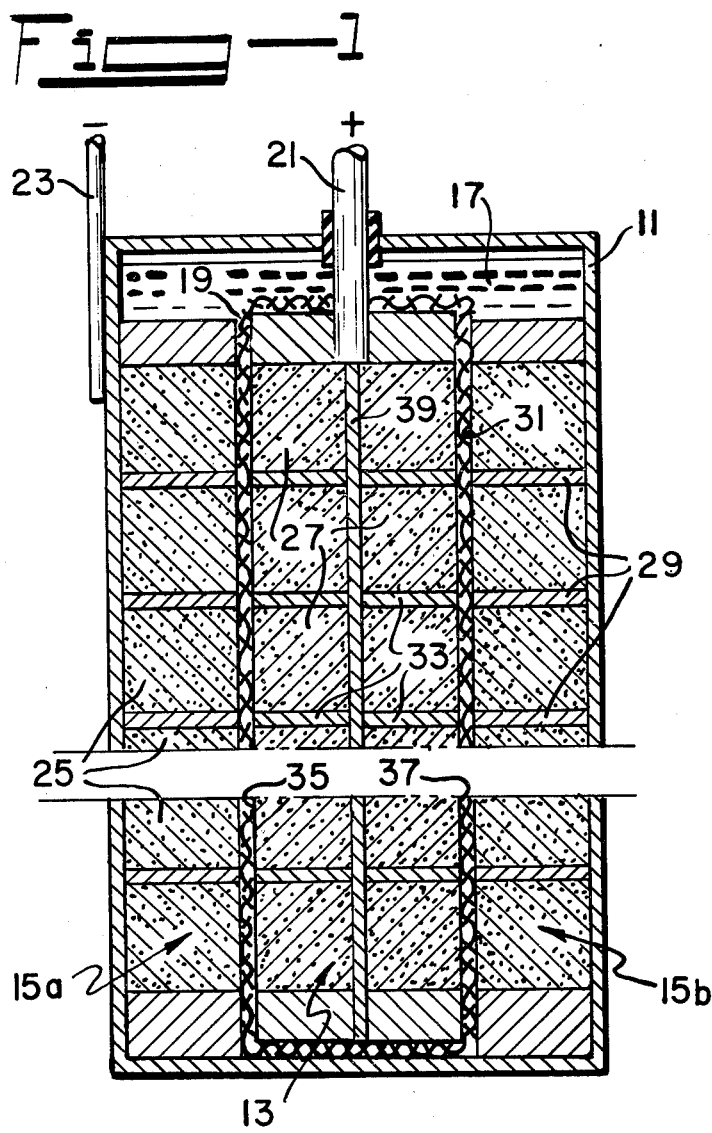
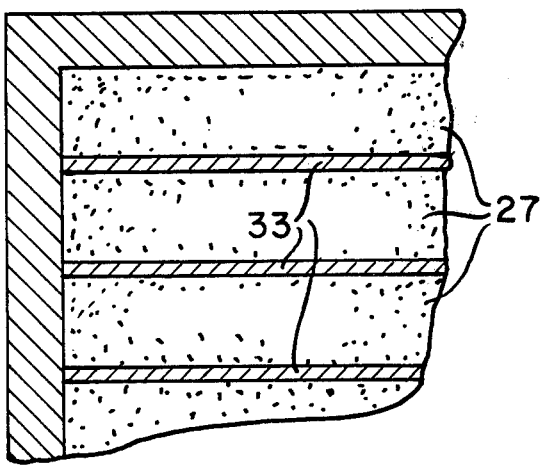
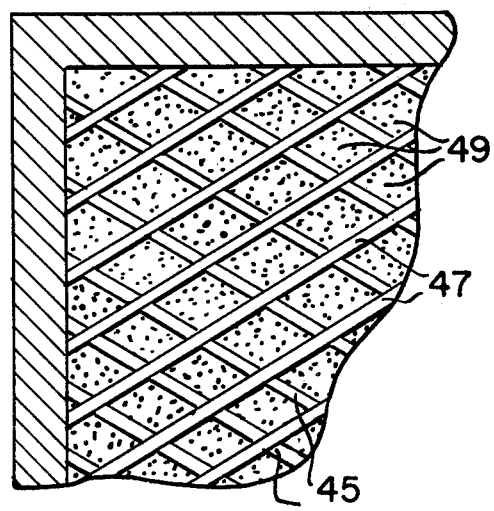

COMPARTMENTED ELECTRODE STRUCTURE

CONTRACTUAL ORIGIN OF THE INVENTION

The invention described herein was made in the course of, or under, a contract with the UNITED STATES ENERGY RESEARCH AND DEVELOPMENT ADMINISTRATION.

BACKGROUND OF THE INVENTION

This invention relates to the preparation of both positive and negative electrodes for use in secondary electrochemical cells and batteries that can be employed as power sources for electric automobiles and for the storage of electric energy generated during intervals of off-peak power consumption.

Substantial work has been done in the development of secondary, high-capacity electrochemical cells and their electrodes. The cells showing the most promise employ alkali metals or alkaline earth metals, often as alloys, as negative electrode reactants and metal sulfides or other metal chalcogenides as reactants within the positive electrode. For good ionic conductance between electrodes, these cells can be operated at elevated temperatures with molten salt electrolytes.

Examples of high-temperature cells and their various components are disclosed in U.S. Pat. No. 3,887,396 to Walsh et al., entitled "Modular Electrochemical Cell", June 3, 1975; U.S. Pat. No. 3,907,589 to Gay and Martino, entitled "Cathodes for a Secondary Electrochemical Cell", Sept. 23, 1975; and allowed U.S. Pat. No. 3,933,520 Jan. 20, 1976, entitled "Method of Preparing Electrodes with Porous Current Collector Structures and Solid Reactants for Secondary Electrochemical Cells", U.S. Pat. No. 3,947,291 Mar. 30, 1976, to Yao and Walsh, entitled "Electrochemical Cell Assembled in Discharged State". Each of these patents is assigned to the assignee of the present application.

In addition to these high-temperature cells, the present invention is also applicable to other types of cells including those operated at ambient temperatures. Cells that employ particulate electrode reactants, that is electrode active materials, can be provided with the improved structure of the present invention to prevent reactant migration resulting from slumping, drifting or electrodeposition in areas of reduced resistance. For instance, lead-acid batteries with particulate lead or lead oxide as electrode reactant material can beneficially employ the improved electrode structures described herein.

Previous electrodes have been prepared with particulate reactant materials blended with electrolyte and in some instances particles of electrically conductive material to form a paste. In positive electrodes, reactants such as transition metal sulfides, e.g. iron sulfides, cobalt sulfides, nickel sulfides and copper sulfides, can be blended with such as powdered carbon, carbon black or powdered iron. Paste compositions of these types can be pressed or otherwise embedded into electrically conductive mesh or other networks and contained in electrically conductive baskets of materials such as iron or molybdenum.

These electrodes have functioned reasonably well in a horizontal orientation but the electrode materials have tended to sag or settle towards the bottom in vertical alignments. In order to prevent this drift of reactant materials, electrically conductive porous substrates such as foamed nickel or vitreous carbon have been employed as current collector structures and the particulate reactant vibratorily loaded into these structures. Although these electrode structures have provided fair support for reactant materials, some problems have been encountered, even where only slight movement of the reactant has occurred.

For instance, in cells employing lithium, generally in alloy form, as negative electrode reactant and a transition metal sulfide as the positive electrode reactant, even a slight slumping of the reactant material in either the negative or the positive electrode will result in a localized mismatch. The consequence of this mismatch can result in a nonuniform movement of lithium into the negative electrode during the charge cycle. As the lithium concentrates locally, free lithium metal or molten lithium alloy may eventually be formed to electrically short the cell. The drifting or slumping of active material can result not only from gravity but also from electrodeposition during charge, of reactant into portions of the cell that have reduced resistance.

A second electrode mismatch problem occurs where a single positive electrode is disposed between two parallel negative electrodes. If the cell resistance between one negative electrode and the positive electrode is slightly less than the corresponding resistance to the other negative electrode, an excess of lithium will electrodeposit into that negative electrode having reduced resistance. The result will be a concentration of lithium in one negative electrode, with possible molten lithium metal or alloy formation.

SUMMARY OF THE INVENTION

Therefore, in view of these problems associated with prior electrode structures, it is an object of the present invention to provide an improved electrode that prevents drift of reactant materials.

It is a further object to provide an electrochemical cell with electrode structures constructed to avoid localized mismatch of reactant materials after cycling of the cell.

It is a further object to provide electrode structures that provide support for particulate reactant material in vertically aligned electrodes.

In accordance with the present invention, a secondary electrochemical cell is provided with a positive and a negative electrode, each communicating with liquid electrolyte. At least one of the electrodes includes solid particles of electrode reactant within an electrode structure that is divided into separate compartments. The compartments are defined by electrically conductive partitions that are generally impenetrable to the reactant particles.

In more specific aspects of the present invention, the compartments include porous electrically conductive material with the electrode reactant distributed within it. The compartments are separated one from the other by a resin-filled mesh or solid sheet of electrically conductive partitions to prevent passage of the reactant particles.

BRIEF DESCRIPTION OF THE DRAWINGS

The present invention is illustrated in the accompanying drawings wherein:

FIG. 1 is an elevation view in cross section of an electrochemical cell.

FIG. 2 is a fragmentary side view of an electrode of the type illustrated in FIG. 1.

FIG. 3 is a fragmentary side view of one other electrode configuration.

DETAILED DESCRIPTION OF THE PREFERRED EMBODIMENT

In FIG. 1, an electrochemical cell is shown with vertically arranged electrodes of a type embodying one form of the present invention. The cell is contained within an outer housing 11 containing a centrally located positive electrode 13 between two negative electrodes 15a and 15b. The housing is filled, except for space for expansion, with liquid electrolyte 17 that permeates a porous electrically insulative fabric 19 intermediate the positive and negative electrodes. In high-temperature cells, molten salt eutectics such as LiCl-KCl and others disclosed in U.S. Pat. No. 3,716,409 can be selected as electrolyte. Conductor 21 penetrates the cell housing 11 and separator fabric 19 into contact with the positive electrode, while the negative electrodes 15a and 15b each make electrical contact to the cell housing 11 which is shown provided with conductor 23.

In practice, various other cell designs may be used with the improved electrodes of the present invention. The cell of FIG. 1 merely represents an example of the type used experimentally to test and prove the operability of the present invention.

The positive electrode 13 and the negative electrodes 15a and 15b are shown each with a plurality of compartments 25 in the negative electrode and 27 in the positive electrode. Compartments 25 within the negative electrode are shown separated and divided from one another by horizontal partitions 29 that extend across the electrode from their inwardly facing, major surfaces 31. Similarly, compartments 27 in positive electrode 13 are illustrated as divided by partitions 33 that run horizontally from each of the positive electrode major surfaces 35 and 37 to the electrode center. In some embodiments partitions 33 can extend completely across the electrode between surfaces 35 and 37 but in the FIG. 1 illustration electrode 13 includes a vertically disposed central partition 39. Partition 39 divides the positive electrode into two vertical portions each having a plurality of compartments 27 defined between the partitions 33.

It will be understood that the partitions and compartments in both the positive and negative electrodes can be of various designs and configurations. FIG. 2 illustrates a fragmentary side view of the electrode illustrated in FIG. 1. The partitions serve as shelves to separate the electrode compartments from the front to the back. It will be clear that vertical partitions, not shown in FIG. 2, can also be included at generally normal dispositions to partitions 33 and 39 to further subdivide compartments 27.

FIG. 3 presents one other example of an electrode configuration. Partitions 45 and 47 course in intersecting alignments so as to intermesh into a honeycomb or network that define compartments 49. Compartments 49 can be of various shapes including diamond, square, honeycomb, etc. Merely by way of example, compartment dimensions of about 0.5 to about 2.5 cm may be used. Each of these partitions 45 and 47, as in the electrode configuration illustrated in FIG. 1, extends from a major electrode surface to the opposing major electrode surface or to an intersecting central partition such as partition 39 in FIG. 1.

It will also be seen that in a particular electrochemical cell either one or more of the electrodes can include one of the contemplated configurations of partitions and compartments. For instance, in some electrochemical cells, it may only be desirable to compartment only the negative or only the positive electrodes, while in others both positive and negative electrodes can be partitioned. Where both electrodes are partitioned, the compartments in opposing electrodes may be in alignment as illustrated in FIG. 1 or in overlapping and other noncorresponding relationships including compartments of different size.

Partitioned electrodes are most useful where prticulate electrode reactants are employed to prevent drifting and redeposition of the reactants. The electrode compartments can contain solid reactant particles of such as, in the negative electrode, lithium-aluminum, lithium-silicon, or lithium alloyed to form binary and ternary compositions with other elements from columns IIA, IIIA or IVA of the Periodic Table. Particulate metals such as lead, nickel, cadmium, etc. might also be employed as reactants.

In positive electrodes, the compartments can contain metal chalcogenides, that is oxides, sulfides and selenides. Particulate iron, nickel, copper and cobalt sulfides and their mixtures have been found well suited as positive electrode reactants opposite lithium alloy negative electrodes.

The electrode reactant can be prepared as a paste of a particulate reactant in molten or semisolid electrolyte and pressed into the electrode compartments. Electrically conductive materials such as particulate carbon or metals might also be included in the paste. Such a paste might beneficially be used with positive electrodes including a metal sulfide reactant. As is described in U.S. Pat. No. 3,947,291, cited above, the paste may comprise a discharged electrode composition. In preparing some electrodes, a thermosetting resin can be blended into the paste and cured to provide a solid electrode portion of a desired shape.

In other electrodes, the reactant can be contained within a porous substrate material. Examples of these materials are given in U.S. Pat. No. 3,933,520, cited above. Preferable porous substrates include foamaceous electrically conductive mmterial such as iron, nickel, nickel-chromium or carbon foam. Some of these are available commercially under the trade names of trademarks Retimet and Foametal. The FIGS. 1 and 2 embodiment is particularly well suited for employing such foamaceous substrates in that a single layer or several layers of foam can be disposed lengthwise in each of the compartments 25 or 27.

In loading these porous substrates, reactant particles can be vibratorily deposited into individual substrate layers, as is described in U.S. Pat. No. 3,933,520. As an alternative, molten lithium alloys can be deposited into such a substrate by casting or by dipping the substrate within the alloy melt. Also, for the preparation of some electrodes, particulate reactant alone or as a paste with electrically conductive material can be pressed into a compact and subsequently disposed within the electrode compartments of similar shape.

Various types of materials can be used for the partitions illustrated in FIGS. 1, 2 and 3. To be effective, the partitions must be generally impenetrable to the particulate electrode reactant and be electrically conductive so as to also serve as a current collector. Sheets or layers of electrically conductive metals that are both impenetrable to the reactant and impermeable to the liquid electrolyte can be used. However, cells of reduced weight can be designed by employing porous sheets, fine mesh, fabrics or cloths of electrically conductive material such as metals or carbon. Such sheets or cloths can have openings that are small in comparison to the average particle size of the reactant, e.g. less than about 120 micrometers. However, the openings are preferably at least partially occluded by applying a thermosetting resin, in paste or liquid form, to the cloth or other porous layer and applying heat to solidify the resin within the openings. As an example, carbon cloth can be treated with a furfuryl alcohol which is subsequently polymerized.

Materials employed for the partitions include those that are generally inert to the electrode reactants at the cell operating temperature. For example, in positive electrodes using metal sulfides as reactants, molybdenum or carbon can be used. In negative electrodes using lithium alloys as reactants, nickel, nickel-chromium alloys, stainless steels and molybdenum are appropriate.

In one particular embodiment of the present invention, a positive electrode is compartmented as illustrated in FIG. 1. Partitions 33 are of small aperture fabric treated with a thermosetting resin or of impermeable sheets to be generally impenetrable to the electrode reactant. However, partition 39, in this particular embodiment, is of a metal sheet of such a molybdenum to be both impenetrable to the reactant particles and impermeable to the liquid electrolyte. Such a positive electrode configuration is particularly useful in metal sulfide-lithium cells where two negative electrodes are positioned on opposite sides of a central positive electrode as illustrated. If the cell resistance between one negative electrode and the positive electrode is slightly less than that between the other negative electrode and the positive electrode, the central impermeable partition 39 will prevent movement of lithium ions during charging towards the one negative electrode of lesser resistance. Thus the use of an impermeable central partition can prevent increased lithium concentration that may result in molten alloy formation. The central positive electrode partition 29 is of even more importance within an electrochemical cell including horizontally aligned electrodes as the force of gravity can tend to concentrate lithium towards the lower negative electrode.

The following examples are presented in order to better illustrate the present invention.

EXAMPLE I (Cell 82)

An electrochemical cell of the general configuration shown in FIGS. 1 and 2 including a central, partitioned positive electrode between two negative electrodes was assembled and tested. The positive electrode included particulate $FeS_2$-15 w/o $CoS_2$ composition vibratorily loaded into layers of vitreous carbon. The layers were separated by horizontal sheets of carbon cloth coated with a resin of polymerized furfuryl alcohol. The negative electrodes were made up of foamaceous nickel metal loaded with particles of about equal atom proportions of lithium-aluminum alloy. No partitions were used in the negative electrode. The cell was operated for over 115 cycles and 2800 hours at cutoff voltages of about 1 on discharge and 2.2 on charge at a capacity density of about 0.6 to 0.7 amp hrs/cm². Additional data regarding the cell are given below in Table I.

TABLE I

| | Cell S-82 |
|---|---|
| Effective Area, cm² | 193.6 |
| Theoretical Capacity A-hr Pos. | 269.6 |
| Neg. | 192.0 |
| Current Density, A/cm² Charge | 0.075 |
| Discharge | 0.052 |
| Cutoff Voltage, IR-Included, V Charge | 2.27 |
| Discharge | 0.90 |
| Typical Capacity, AHr | 130.0* |
| Typical Capacity Density, AHr/cm² | 0.67 |
| Percentage Utilization, % Li-Al | 67 |
| $FeS_2$-$CoS_2$ | 48 |
| AHr, Efficiency, % | 95 |
| Temperature, °C | 435° – 463° |

*Last 1000 hrs.

EXAMPLE II (Cell LP-1)

An electrochemical cell was prepared with the negative electrode arranged in horizontal compartments. Lithium-aluminum alloy strips were electrochemically prepared by reacting lithium metal with compacts of aluminum fiber. The compacts were assembled into a frame having horizontal stainless steel partitions to form the separate compartments of the electrode. Each compartment with lithium-aluminum alloy strips included an about 0.6 × 6 cm surface facing the positive electrode and about 0.3 cm depth towards the partitions and frame. The positive electrode contained particulate FeS and $Cu_2S$ loaded into a porous stainless steel current collector which was assembled with LiCl-KCl salt and the negative electrode to form the electrochemical cell. The cell was cycled through about 13 charges and discharges at 450°–500° C., at 0.5–2.0 A and about 6–8 amp-Hr.

It can be seen from the description and examples that the present invention provides an improved electrode structure for use in electrochemical cells. The structure includes a plurality of partitions to divide the electrode into compartments and thereby prevent or inhibit slumping, drifting or other movement of reactant material. Through use of the present electrode structure, electrochemical cells using vertically aligned electrodes and cells having slight mismatches in electrical resistance and initial reactant loading can be given enhanced life at acceptable capacity levels.

The embodiments of the invention in which an exclusive property or privilege is claimed are defined as follows:

1. In a secondary electrochemical cell having a positive and a negative electrode with liquid electrolyte between said electrodes, wherein said positive electrode includes solid particles of metal sulfide as reactant and is positioned intermediate two negative electrodes each having lithium as reactant, the improvement wherein said positive electrode is divided into separate compartments by electrically conductive partitions that are generally impenetrable to said particulate reactant and wherein said positive electrode has major surfaces facing and parallel to opposing major surfaces of said negative electrodes and includes a central partition comprising an electrically conductive metal sheet impenetrable to liquid electrolyte and particulate reactant disposed generally parallel to said facing major surfaces so as to divide said positive electrode into two separate and parallel electrode portions.

2. The secondary electrochemical cell of claim 1 wherein said positive electrode comprises a porous electrically conductive substrate having solid reactant particles distributed therein and said substrate is divided into separate compartments by said electrically conductive partitions.

3. The secondary electrochemical cell of claim 1 wherein both said positive and negative electrodes include particulate reactant and are each divided into separate compartments by electrically conductive partitions that are impenetrable to the respective, particulate electrode reactant.

4. The secondary electrochemical cell of claim 1 wherein said partitions comprise layers of electrically conductive fabric coated with polymerized resin to inhibit passage of said reactant particles.

5. The secondary electrochemical cell of claim 1 wherein said partitions comprise solid, metal sheets impenetrable to both said electrode reactant particles and to said electrolyte.

6. The secondary electrochemical cell of claim 1 wherein said partitions comprise a plurality of partitions aligned in at least two intersecting courses to intermesh into a network defining a plurality of compartments between the intersecting partitions.

7. The secondary electrochemical cell of claim 1 wherein said partitions comprise horizontal layers across a vertical electrode structure to inhibit downward drifting of electrode reactant particles.

8. The secondary electrochemical cell of claim 1 wherein each electrode portion includes a plurality of electrode compartments.

9. In a secondary electrochemical cell having a positive and a negative electrode with liquid electrolyte between said electrodes, wherein at least one of said electrodes comprises porous substrate of electrically conductive material having solid particles of electrode reactant distributed throughout the void volume of said substrate, the improvement wherein said one electrode having said solid particles of electrode reactant is divided into separate portions of said electrically conductive substrate by partitions of electrically conductive material that are generally impenetrable to said particles of electrode reactant.

10. The secondary electrochemical cell of claim 9 wherein said electrically conductive porous substrates comprise porous aluminum material containing particles of lithium-aluminum alloy and said partitions comprising sheets of lithium-resistant metals that are impenetrable to liquid electrolyte and electrode reactant particles.

* * * * *